United States Patent [19]

McKibbin et al.

[11] 4,190,236
[45] Feb. 26, 1980

[54] APPARATUS FOR GUIDING A TOOL IN A LINEAR PATH RELATIVE TO A WORK PIECE, AND METHOD OF MANUFACTURE THEREOF

[76] Inventors: John R. McKibbin; Frederick B. Tyler, Jr., both of P. O. Box 58002, Birmingham, Ala. 35209

[21] Appl. No.: 23,242

[22] Filed: Mar. 23, 1979

[51] Int. Cl.² .............................................. B23K 7/10
[52] U.S. Cl. ...................................... 266/69; 264/331
[58] Field of Search ................... 266/69; 264/331, 239

[56] References Cited

U.S. PATENT DOCUMENTS

| | | | |
|---|---|---|---|
| 2,279,338 | 4/1942 | Oldham . | |
| 2,345,412 | 3/1944 | Moore . | |
| 2,389,585 | 11/1945 | Anderson . | |
| 2,433,734 | 12/1947 | Bucko . | |
| 2,571,196 | 10/1951 | Bucknam . | |
| 2,617,644 | 11/1952 | Helmkamp . | |
| 3,434,706 | 3/1969 | Roder . | |
| 3,608,878 | 9/1971 | Dreshman | 266/69 |
| 3,866,484 | 2/1975 | Dreshman | 266/69 |

OTHER PUBLICATIONS

Thomson Industries, Inc., Catalog #308, Jan. 1975, pp. 1–12.
Thomson Industries, Inc., Catalog #128, Jun. 1973, pp. 1–8.
Thomson Industries, Inc., Form 514, Jul. 1969, pp. 1–12.

*Primary Examiner*—W. Stallard
*Attorney, Agent, or Firm*—Donald R. Andersen

[57] ABSTRACT

An improved apparatus for guiding a tool in a linear path relative to a work piece, and method of manufacture thereof, including a means for supporting the work piece, a transverse tool carrying member supported above the work piece and perpendicularily across a plurality of collinear tracks, one of said tracks being a precisely aligned master track and the remainder of the collinear tracks being follower tracks made from an epoxy material which is poured and permitted to harden into a horizontal track surface on which the transverse tool carrying member is rollingly supported.

20 Claims, 11 Drawing Figures

APPARATUS FOR GUIDING A TOOL IN A LINEAR PATH RELATIVE TO A WORK PIECE, AND METHOD OF MANUFACTURE THEREOF

BACKGROUND OF THE INVENTION

The present invention relates to the art of guiding a tool in a linear path relative to a work piece. In particular, the present invention relates to the art of guiding a plurality of tools in collinear paths relative to a single work piece.

It has been known in the art that one type of apparatus for guiding a plurality of tools or a single tool in a linear path relative to a single work piece is a framework having a plurality of collinear tracks which movably support a transverse member carrying a plurality of tools. The work piece may then be placed between the collinear tracks and the tools may be guided in a linear fashion with respect to said work piece by the movement of the transverse tool-carrying member along the collinear tracks.

The above-described apparatus has particular utility when the tools carried by the transverse member are cutting tools. By use of such an apparatus, a single work piece may be cut into a plurality of strips of uniform width and length.

Of course, the accuracy by which such an apparatus will guide a tool over a linear path relative to a work piece depends, among other things, upon the precision with which the collinear tracks are initially aligned. In certain applications, particularly those involving large work pieces up to approximately 12 feet in width and 40 feet in length, any small misalignment of the collinear tracks may be magnified into a significant deviation from the desired linear path. Indeed, in certain such large-scale operations a deviation of more than 0.07 inchs over the 40 foot length of the work piece is unacceptable. Thus, the difficulty and precision required in the initial alignment of the collinear track can easily be appreciated.

SUMMARY OF THE INVENTION

The present invention is an improvement in an apparatus for guiding a tool in a linear path relative to a work piece. The method of manufacture of the improved apparatus eliminates the requirement for precise alignment of collinear tracks by providing a first precisely aligned master track, a second collinear follower track, and a transverse tool-carrying member which is movably supported in perpendicular communication with the first master track and which is in rolling supportive communication with the follower track. The perpendicularity between the transverse member and the guide and follower track is maintained by providing a follower track having a horizontal supportive surface in rolling communication with the transverse member.

It will be understood from the foregoing description that one of the objects of the present invention is to eliminate the necessity for co-alignment of collinear tracks in the manufacture of an apparatus for guiding tools in a linear path relative to a work piece, and also to eliminate the inaccuracies inherent in even the most minor misalignment of the collinear tracks.

It is a further objective of the present invention to provide enhanced accuracy in an apparatus for guiding a tool in a linear path relative to a work piece by providing an apparatus which is capable of accurately and precisely guiding a tool in such a linear path relative to the work piece.

An additional objective of the present invention is to provide an apparatus for guiding a tool in a linear path relative to a work piece which may be manufactured by a method which may be performed easily on the job site and which may be made primarily from materials available on the job site.

The foregoing objectives and advantages of the present invention, as well as additional objectives and advantages of the present invention, will be understood more fully by reading the following description of a preferred embodiment of the present invention and by reviewing the attached drawings of a preferred embodiment of the present invention, in which the parts shown in the drawings and the parts described in the specification are identified by like numbers.

DETAILED DESCRIPTION OF A PREFERRED EMBODIMENT AND PREFERRED METHOD OF MANUFACTURE

The present invention provides an improvement in an apparatus for guiding a tool in a linear path relative to a work piece, including a plurality of collinear tracks which support a transverse member on which the desired tool is carried. The collinear tracks may be situated on opposite sides of the portion of the work piece in relation to which the tool is to be guided. One of the collinear tracks is a master track on which the transverse member is movably and perpendicularily supported. The master track guides and limits the movement of the transverse member to movement perpendicular to the transverse member and parallel to the longitudinal axis of the master track. The improved apparatus further includes a follower track which also supports the transverse member. The transverse member is rollingly supported by the follower track, and the follower track has a horizontal supportive surface which permits the transverse member to move smoothly and evenly with respect to the follower track thereby preserving the linearity of movement provided by the master track.

One embodiment of the present invention has found particular utility in the art of cutting large metallic plates into smaller rectangular plates. The accuracy and precision achieved by such embodiment in guiding a cutting tool in a linear path relative to the metal plate to be cut permits the quick and relatively easy cutting of large rectangular plates with considerable accuracy. A detailed description of a preferred embodiment of an improved apparatus adapted for cutting large rectangular metallic plates in set forth below. It will, however, be understood that the scope of the present invention is not limited to an apparatus for cutting large metallic plates, but is directed to the general art of guiding a tool in a linear path relative to a work piece, and may be used with a variety of tools in a variety of applications and with a variety of different work pieces. It will therefore be understood that the scope of the present invention is not limited by the following description of a preferred embodiment of an improved apparatus adapted for cutting large rectangular metallic plates, but is limited solely by reference to the appended claims.

Figure 1:
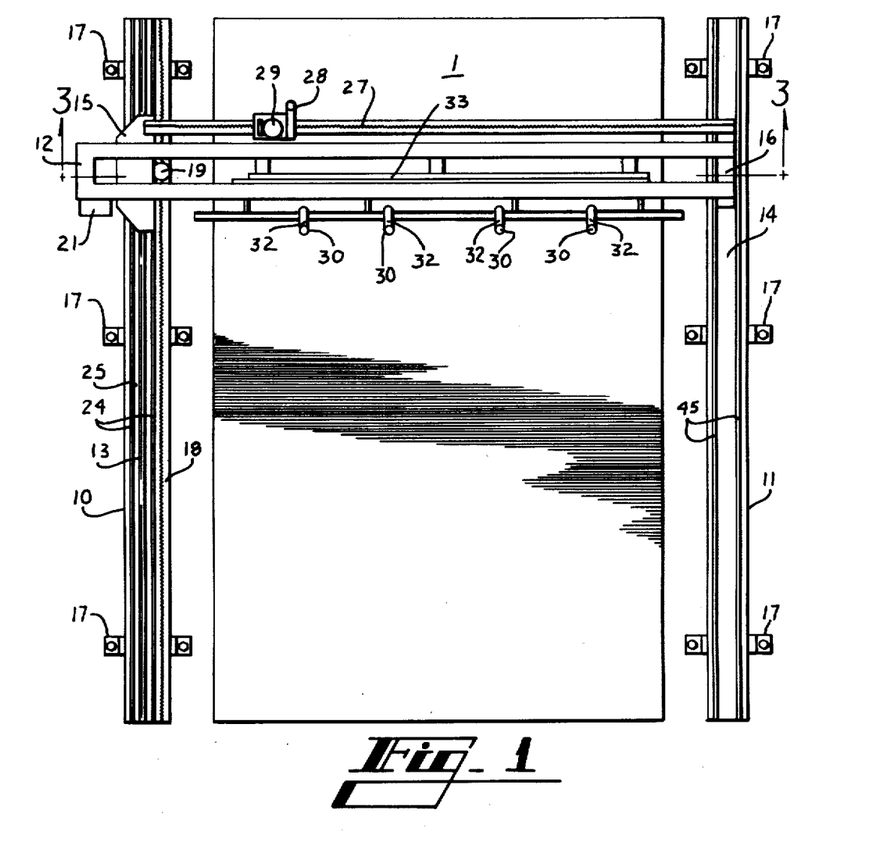
FIG. 1 is a top view of a preferred embodiment of the present invention and further showing a work piece.

Referring now to FIG. 1, a top view of the preferred embodiment of the present invention adapted to the cutting of large rectangular metallic plates is shown. The improved apparatus includes teo collinear tracks, a master track 13, and a follower track 14, which tracks are laterally displaced and are arranged on both sides of the work piece 1. A transverse member 12 is situated between the master track 13 and the follower track 14. The end of the transverse member 12 which is carried by the master track 13 is in supportive communication with the master track 13 by means of a carriage 15. The end of the transverse member 12 supported by the follower track 14 is in supportive communication with the follower track 14 by means of a follower 16.

Figure 2:
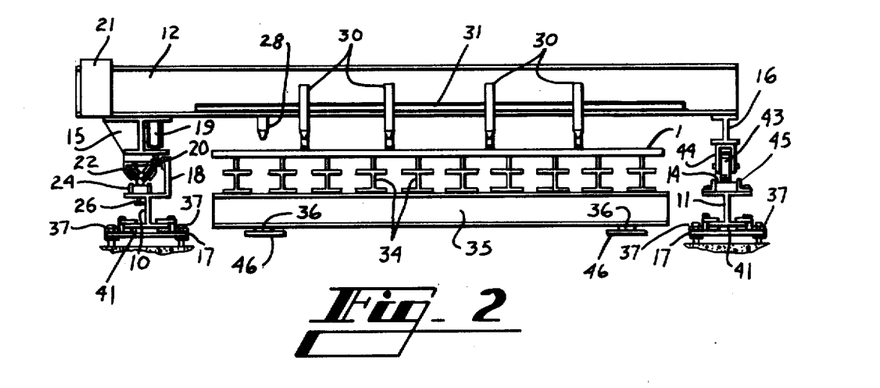
FIG. 2 is a front view of a preferred embodiment of the present invention and further showing the work piece.
Figure 3:
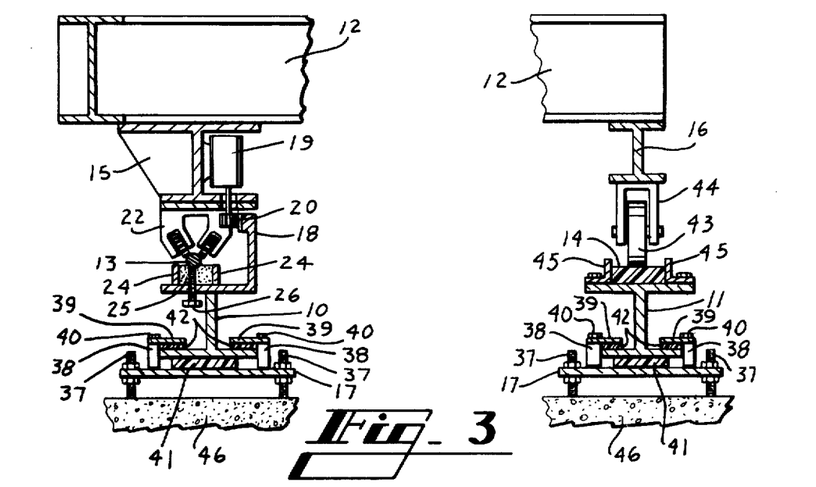
FIG. 3 is a section view taken along a line 3—3 of FIG. 1 showing a detailed front view of the first parallel beam, master track, carriage, transverse beam, follower track and second parallel beam, as well as related parts.

As shown in FIGS. 1–3, the master track 13 is constructed of a hard, smooth, metallic alloy having a circular cross-section. A suitable material for the construction of such a master track 13 is generically known in the trade as a roundway "THOMSON WEAR RESISTENT 60 CASE," a registered trademark of Thomson Industries, Inc., Manhasset, New York. A selection of a roundway for the construction of the master track 13 is preferred because such roundways are manufactured with the desired precision, both as to linearity and uniform diameter, and the surface of the roundway is sufficiently smooth and highly polished for use as a guide or master track 13 in an improved apparatus adapted for cutting large rectangular metallic plates. In addition, the roundway material is hard and wear resistent, thereby minimizing the need for replacement of the master track 13.

The master track 13 is mounted on the upper surface of an I-beam 10 which is aligned with the desired alignment of the master track 13. In the preferred embodiment shown in FIGS. 1 through 3, the master track 13 is made from a roundway which is mounted in the conventional manner on the upper surface of the I-beam 10. Such mounting is accomplished by constructing a roundway channel having vertical edges 24 longitudinally carried on the upper surface of the I-beam 10. As will be set forth more fully below, the I-beam 10 is mounted on a plurality of metallic plates 17 which are each set in cement or concrete bases 46. While the I-beam 10 is itself longitudinally aligned with the desired longitudinal alignment of the master track 13 by the proper adjustment and placement of the mounting plates 17, additional alignment of the master track 13, in this case, a roundway, is necessary to provide the precise and accurate master track 13 alignment desired for the accurate and precise guidance of the transverse member 12 over the work piece 1.

the master track 13, in this case a roundway, may be aligned on the I-beam 10 in any suitable fashion to provide the desired precision and accuracy in master track 13 alignment. As shown in FIG. 3, the master track 13 is supported horizontally by a bolt 26 extending vertically through the upper flange of the I-beam 10. In the initial alignment of the master track 13, it is also necessary to provide additional bolts extending horizontally through the vertical edges of the roundway channel 24 in order to provide lateral and longitudinal alignment of the guide track 13. The precise horizontal, lateral and longitudinal alignment of the master track 13 may be achieved by the use of conventional alignment techniques utilizing optical collimators or alignment telescopes. Once the master track 13 is properly aligned in the roundway channel 24, it may be permanently secured by the addition of a grout 25 into the roundway channel 24. Once the master track 13 is permanently secured in the roundway channel 24, the additional horizontal bolts extending through the vertical edges of the roundway channel 24 should be removed in order to permit the carriage 15 to travel freely over the master track 13.

In addition to the above-described method of mounting the master track 13 on the upper surface of the I-beam 10, such mounting may also be accomplished by the use of commercially available waymounts, shaft supports or support rails. Such alternative methods of roundway alignment will be suitable for use in the present invention as long as they permit the accurate longitudinal, lateral and horizontal final adjustment of the roundway, and also permit the free movement of the carriage 15 along the master track 13.

As shown in FIGS. 1 through 3, both the master track 13 and the follower track 14 are supported by I-beams 10 and 11, respectively. The I-beams 10 and 11 are mounted on a plurality of mounting plates 17 which are set in concrete bases 46. As shown most clearly in FIG. 3, each mounting plate 17 is secured to a concrete base 46 by means of a plurality of bolts 37. The plurality of bolts 37 permit the vertical adjustment of each mounting plate 17 in aid of the overall objective of providing precise horizontal alignment of the master track 13, and the objective of providing horizontal alignment of the follower track 14 as will be described more fully below. The individual I-beams 10 and 11 are secured to each of the mounting plates 17 by means of a bracket having vertical edges 38 to prevent the lateral movement of the I-beam and an upper horizontal flange element 39 to prevent the vertical movement of the I-beams 10 and 11. In the preferred embodiment shown in FIG. 3, the vertical element 38 and horizontal flange element 39 are secured to each other and to the mounting plate 17 by means of a bolt 40 which extends vertically through the horizontal flange element 39 and the vertical element 38 to the mounting plate 17.

In the preferred embodiment described herein, the cutting tools 30 used in the cutting of the large metallic plates may be oxygen-acetylene gas, oxygenfuel gas, or plasma arc torches. The operation of such cutting tools 30 generates considerable heat which, in addition to the ordinary atmospheric changes in temperature, may cause thermal deformation of the I-beams 10 and 11, respectively. In order to minimize any buckling or longitudinal deformation effects from such thermal expansion, the I-beams 10 and 11 are in sliding communication with the plurality of mounting plates 17, thereby permitting the uniform longitudinal thermal expansion of the I-beams 10 and 11 without the longitudinal deformation or buckling which would occur if the I-beams 10 and 11 were rigidly secured or pinned to the plurality of mounting plates 17.

In aid of the foregoing objective of assuring sliding communication between the I-beams 10 and 11 and the plurality of mounting plates 17, resilient members 41 and 42 have been inserted between the I-beams 10 and 11 and the metallic surfaces of the mounting plate 17 and the upper flange members 39 of the bracket, respectively. A suitable material for such resilient members is high molecular weight polyethylene or phenolyl plastic. It will be understood, however, that other resilient materials may also be suitable for assuring adequate sliding communication between the I-beams 10 and 11, and the plurality of mounting plates 17 and the upper flange elements 39 of the bracket.

As will be more fully appreciated from the following discussion of the operation of the improved apparatus, the follower track 14 must have a horizontal surface over which the follower 16 may roll as it supports the transverse member 12. A horizontal surface for the follower track 14 is necessary so that the end of the transverse member 12 supported by the follower 16 is permitted to move at the same rate as the end of the transverse member supported by carriage 15 and guided over the master track 13. Further, a smooth surface is also desirable to minimize the effects of friction which might cause the follower 16 to lag behind the carriage 15. A hard surface is also desirable in order to assure that the follower track 14 does not become worn due to normal operation.

The follower track 14 is constructed by initially fabricating a follower track mold and channel 45 having two vertical edges longitudinally arranged on the upper surface of the I-beam 11 and laterally displaced to provide a mold and channel for a follower track 14 of sufficient width to rollingly accommodate the carriage 16. For purposes of fabricating the follower track 14, vertical edges should also be added to the ends of the follower track mold and channel 45. It will be understood, however, that the end vertical edges of the follower track mold and channel 45 may be removed after the fabrication of the follower track 14 and are not necessarily a part of the finished or completed improved apparatus.

Once the follower track mold and channel 45 has been fabricated on the upper surface of the I-beam 11, a liquid graphite epoxy composite material is introduced to the follower track mold and channel 45. The liquid graphite epoxy composite is then permitted to harden forming a hard, smooth, and horizontal follower track 14 within the follower track mold and channel 45. While the preferred embodiment described herein utilizes a graphite epoxy composite material for the formation of the follower track 14, it will be understood by those skilled in the art that other substances capable of being introduced into the follower track mold and channel 45 in a liquid or self leveling state, and which are capable of hardening or setting into a solid material having a hard, smooth, and horizontal upper surface may also be suitable for use in the present invention. In addition, other epoxy materials and thermosetting resins may be utilized even though they do not contain graphite, the advantage of the graphite epoxy material being primarily the contribution of improved lubricating characteristics as a result of the graphite additive.

As shown in FIG. 2, the work piece 1 is supported by a plurality of longitudinal beams 34, which are in turn supported by a plurality of transverse support beams 35. The transverse support beams 35 are mounted in concrete bases 46 by any suitable mounting brackets 36.

Figure 4:
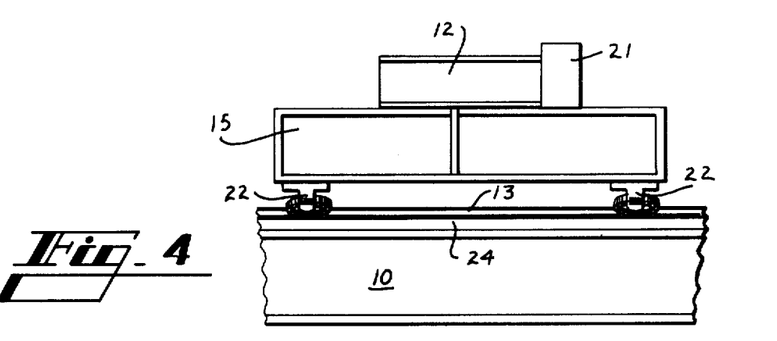
FIG. 4 is a side view of the transverse member, carriage and a section of the master track and first parallel beam.

As shown in FIGS. 3 through 6, the transverse beam 12 is movably supported upon the master track 13 by a carriage 15, and is rollingly supported by the follower track 14 by means of a follower 16. As shown in FIGS. 3 and 4, the carriage 15 is provided in the preferred embodiment by a segment of I-beam which is longitudinally situated with respect to the master track 13 and which is rigidly and perpendicularly fixed to the transverse member 12.

Figure 6:
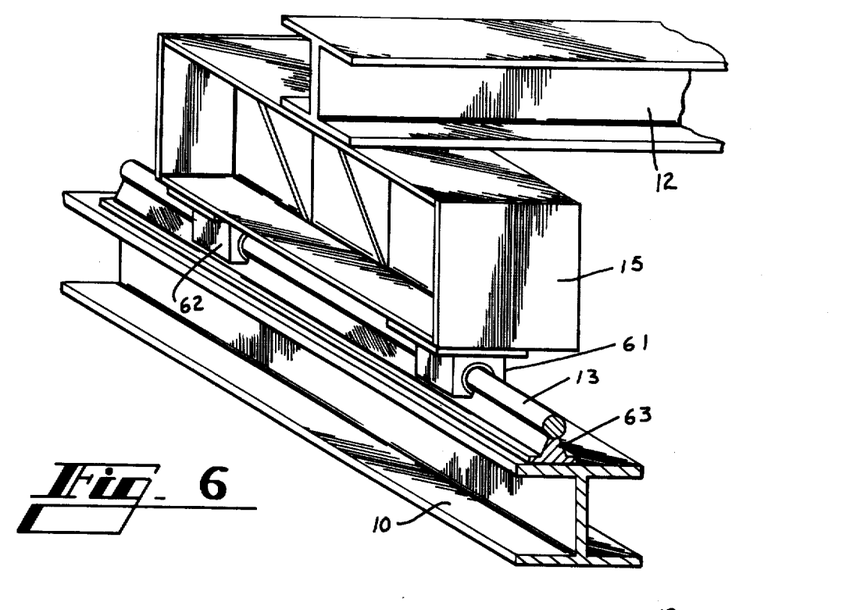
FIG. 6 is a perspective view of an alternative means for movably supporting said carriage on said master track.

The carriage 15 further includes a suitable means for movably supporting the carriage 15 in communication with the master track 13. In the preferred embodiment in which the master track 13 includes a roundway, carriage 15 may be movably supported with respect to the roundway by standard roundway bearings 22, as shown in FIG. 3 or, alternatively, ball bushings 61 designed for use with the roundway as shown in FIG. 6. The roundway bearings 22 or ball bushings 61 utilitized in the preferred embodiment described herein are of the type commercially available, and it has been found that roundway bearings and ball bushings manufactured by Thomson Industries, Inc., of Manhasset, New York are suitable for use with the "THOMSON 60 CASE" roundway which has been described above for use in this embodiment as the master track 13.

Roundway bearings 22 or ball bushings 61 are preferred over a plurality of wheels or rollers because the roundway bearings 22 and ball bushings 61 provide improved linear guidance over the length of the master track 13. The roundway bearings 22 or ball bushings 61 maintain greater surface contact with the master track 13 than a plurality of wheels or rollers. Further, the roundway bearings 22 or ball bushings 61 can be fit to a zero fit tolerance of approximately 0.0001 to 0.0002 inches to the master track 13 to assure that the perpendicular alignment between the carriage 15 and the master track 13 is maintained. Finally, the roundway bearings 22 or ball bushings 61 have a higher load bearing capacity than a plurality of wheels or rollers.

As shown clearly in FIG. 3, the roundway bearings 22 are diagonally mounted with respect to the circular cross-section of the roundway so as to prevent lateral movement of the carriage 15 with respect to the guide track 13. As shown in FIG. 4, the roundway bearings 22 supporting the carriage 15 are also longitudinally displaced with respect to the master track 13. By means of the diagonal and longitudinal displacement of the roundway bearings 22, the carriage 15 is permitted to travel smoothly over the master track 13, while securely maintaining and preserving the perpendicular alignment of the transverse bar 12 with respect to the master track 13.

As shown in FIG. 6, ball bushings 61 and 62 may be conventionally mounted to provide movable support between the master track 13 and the carriage 15. Of course, the ball bushings 61 and 62 include bearing surfaces which are diagonally displaced with respect to the cross-section of the master track 13, and, accordingly, the requirement of a plurality of bearing surfaces diagonally displaced with respect to the cross section of the master or guide track 13 may be satisfied by the use of the individual ball bushings 61 and 62 to provide the required plurality of bearing surfaces. It is nonetheless preferred to include the second ball bushing 62, which second ball bushing 62 is longitudinally displaced with respect to the master track 13 from the first ball bushing 61. By means of the longitudinal displacement of ball bushing 61 and ball bushing 62, the carriage 15 is permitted to travel smoothly over the master track 13, while securely maintaining and preserving the perpendicular alignment of the transverse bar 12 with respect to the guide track 13.

Figure 7:
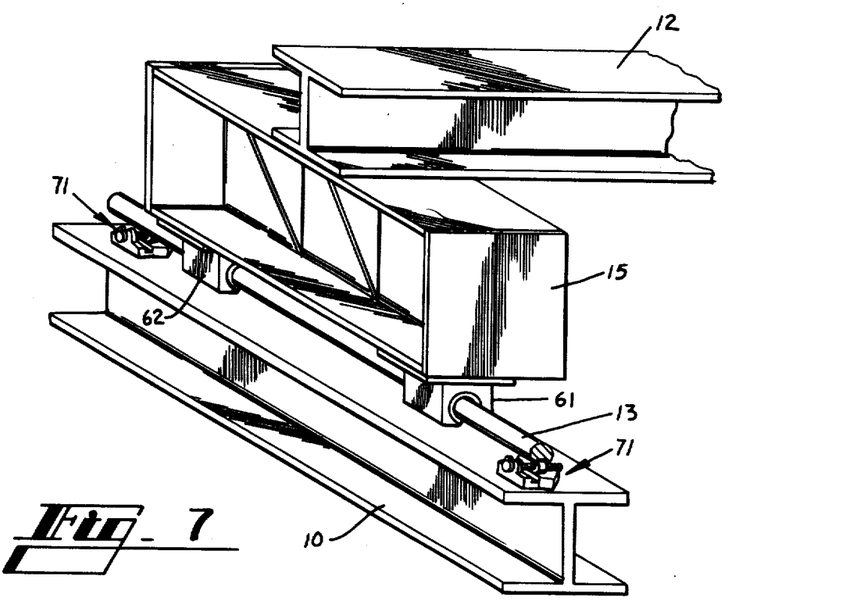
FIG. 7 is a perspective view of a second alternative means for movably supporting said carriage on said master track.
Figure 8:
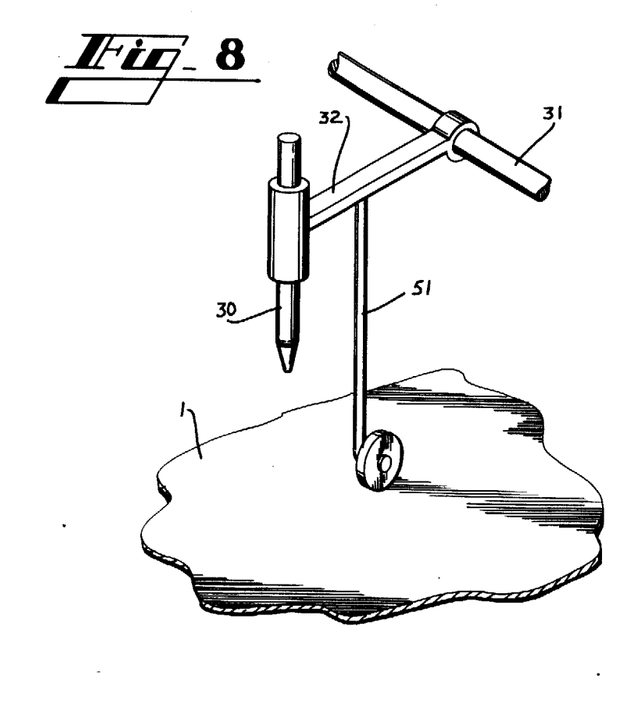
FIG. 8 is a perspective view of a first embodiment of an apparatus for mounting cutting tools on the transverse member.

In an embodiment of the present invention in which the means for movably supporting the carriage 15 in communication with the master track 13 includes ball bushings, such as ball bushings 61 and 62 shown in FIG. 6, an alternative method of mounting the roundway 13 may be desired to provide an adequate circumferential roundway surface for the proper operation of the ball bushing. As shown in FIG. 6, one such method of supporting the roundway 16 is to provide a rail 63 which runs longitudinally along the upper surface of the I-beam 10 and which extends perpendicularily from said upper surface of the I-beam 10 to support the roundway 13. Alternatively, the roundway 13 may be mounted on the I-beam 10 by a plurality of commercially available waymounts 71, as shown in FIG. 7, which may be placed along the length of the roundway 13 to provide support for the roundway 13 along the upper surface of the I-beam 10 without obstructing the operation of the ball bushings 61 and 62. It should, however, be stated that such waymounts 71 may not provide the degree of support to the roundway 13 which is provided for the heavy carriage 15 and transverse member 12 by the continuous support rails 63 as shown in FIG. 6, or the method of mounting the roundway 13 in a roundway channel having vertical edges 24 as shown in FIGS. 1 through 3.

The carriage 15 may be manually powered or may be powered by any other suitable means for motivation. It is desirable that such means for motivation be capable of smoothly moving the carriage 15 along the master track 13 at a uniform rate. In the preferred embodiment described herein, an electric motor 19 is mounted on the carriage 15. The electric motor 19 is mechanically connected to a drive gear 20 which drivingly engages a longitudinal drive track 18 which may be welded or otherwise suitably secured to the I-beam 10 and which extends vertically from the upper surface of the I-beam 10 along the length of the I-beam 10.

Figure 5:
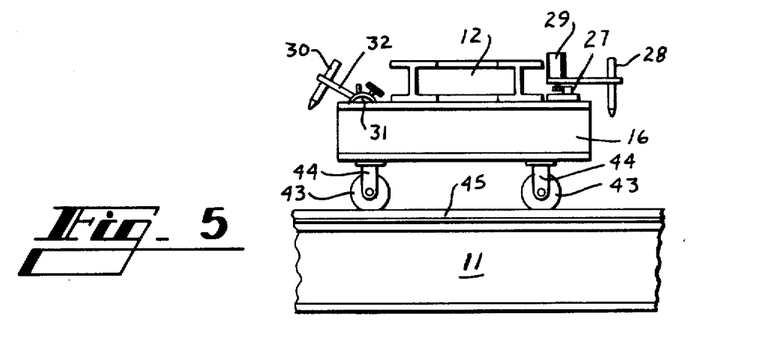
FIG. 5 is a side view of the transverse member, follower, follower track and second parallel beam.

As shown in FIGS. 3 and 5, the follower 16 also includes a section of I-beam which is perpendicularly and rigidly affixed to the bottom of the transverse beam 12. The follower 16 provides a means for rollingly supporting the transverse beam 12 on the follower track 14 by a plurality of casters 43 longitudinally displaced with respect to the follower 16. The casters 43 are mounted on the follower 16 by means of a conventional mounting bracket 44. It will be understood, however, that the follower 16 may be rollingly supported by any other means of rolling support and that the use of casters 43, such as those described in the preferred embodiment is not required.

As shown in FIGS. 1, 2, 5 and 8, the transverse member 12 is carried by the carriage 15 and the follower 16. A plurality of cutting tools 30 are mounted on transverse ar 12 by means of a transverse mounting bar 31, and by means of mounting arms 32. A plurality of cutting tools 30 are mounted on transverse bar 12 by means of a transverse mounting bar 31, and by means of mounting arms 32 rotatingly secured to the transverse mounting bar 31. The mounting arms 32 further include support wheels which extend vertically from the mounting arms 32 to the upper surface of the work piece 1. The support wheels 51 are provided to maintain the approximate distance between the individual cutting tools 30 and the work piece 1.

Due to the angular rotation of the individual cutting tools 30 about the transverse mounting bar 31, the distance between individual cutting tools 30 and the work piece 1 and the orientation of the cutting tools 30 with respect to the work piece 1 are not always constant. An improved and preferred mounting structure has been invented and is also disclosed herein.

Figure 9:
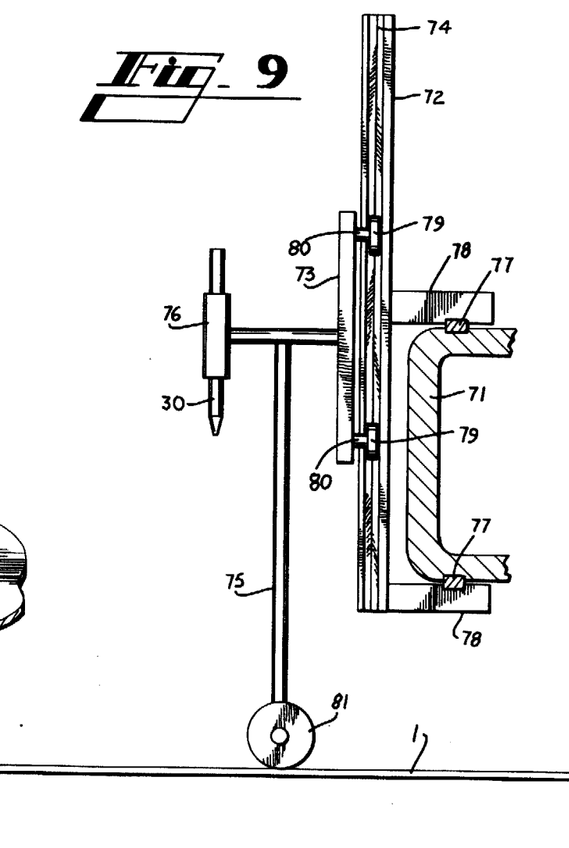
FIG. 9 is a side view of a second embodiment of an apparatus for mounting cutting tools on the transverse member.
Figure 10:
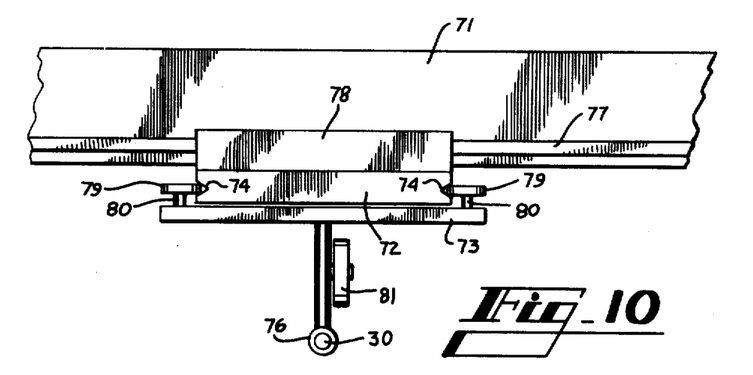
FIG. 10 is a top view of a second embodiment of an apparatus for mounting cutting tools on the transverse member.
Figure 11:
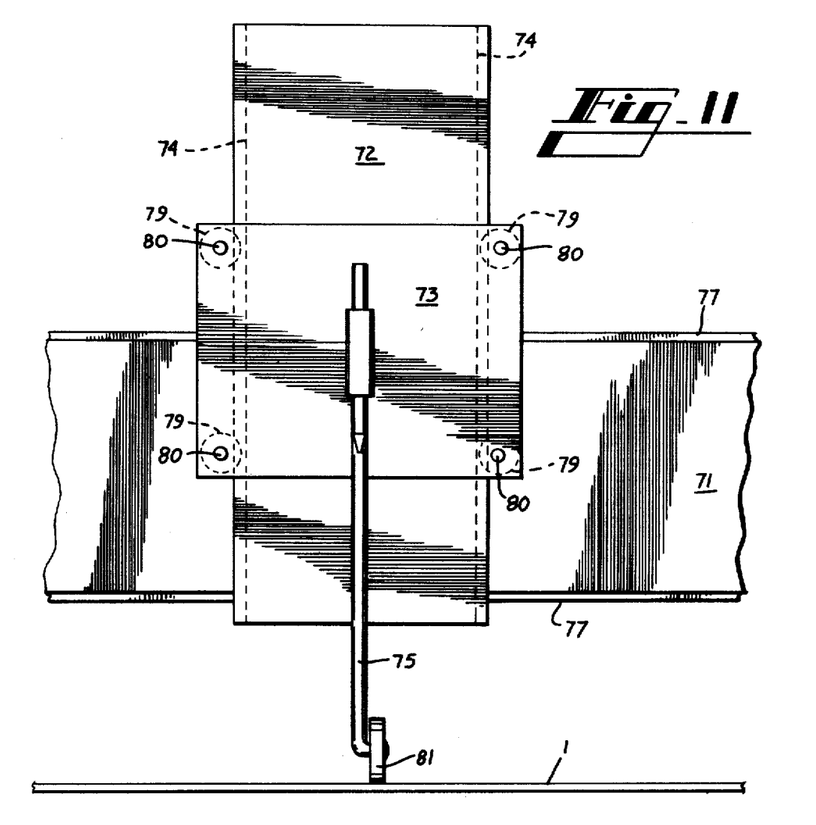
FIG. 11 is a front view of a second embodiment of an apparatus for mounting cutting tools on the transverse member.

As shown in FIGS. 9, 10 and 11, the improved mounting structure may be mounted on a transverse member 71 made from a channel section beam. The improved mounting structure includes a mounting plate 72; a vertically movable carriage 73 which is rollingly secured in parallel tracks 74 vertically oriented in the edges of the mounting plate 72; a conventional mounting arm 76 carried on the movable carriage 73; and at least one vertical support roller 75 extending vertically from the mounting arm 76.

The mounting plate 72 is secured to the transverse member 71 by means of trackways 77 which are located in the top and bottom surfaces of the transverse member 71 to which the mounting plate 72 is secured. The mounting plate 72 includes mounting brackets 78 which slidingly engage the trackways 77 and permit the mounting plate 72 to be moved along the trackways 77 in order to provide the desired placement of the mounting plate 72 along the transverse member 71.

In order to facilitate the sliding communication between the mounting brackets 78 and the trackways 77, it is preferred that the mounting bracket 78 be manufactured from a high molecular weight polyethylene. It has been found that a plastic sold under the trade name Durowear by the Durowear Corporation of Birmingham, Alabama, is suitable for use in the manufacture of the mounting brackets 78. The trackways 77 may be made of aluminum or any other smooth material which will facilitate the sliding communication between the mounting brackets 78 and the trackways 77.

It will be further understood that once adjusted along the transverse member 12 or transverse member 71, the mounting arm 32 or mounting plate 72 should be secured in place by means of conventional clamps, brackets or set screws before operation is started.

The vertically movable carriage 73 is rollingly carried on the mounting plate 72 in the vertical tracks 74. The vertical tracks 74 should preferably have a sixty degree "v" cross-section in order to provide a close fit between the wheels 79 and the vertical track 74. As shown in FIGS. 9 through 11, the preferred embodiment disclosed herein includes four wheels 79 which are secured to the bottom surface of the movable carriage 73 by means of axles 80. The wheels 79 are in rolling communication with the vertical trackways 74.

In operation, the moveable carriage assures a constant vertical distance between the cutting tool 30 and the work piece 1. As the cutting tool 30 passes over the work piece 1, the verticle distance between the cutting tool 30 and the work piece 1 remain constant without any deviation induced by angular rotation of the tip of the cutting tool 30 away from the work piece 1. In addition, the angle of the cutting tool 30 with respect to the work piece 1 as adjusted in the mounting arm 76 will also remain constant without any angular deviation being induced by the rotation of the cutting tool 30 about a transverse mounting bar, such as the transverse mounting bar 31 described in the first embodiment of an apparatus for mounting the cutting tools on the transverse member.

As described above, the cutting tools 30 may be either oxygen-acetylene gas, oxygen-fuel gas or plasma arc torches. For clarity, the fuel lines associated with the individual cutting tools 30 have been omitted from the drawing, but such fuel lines may be attached to the cutting tools 30 and mounted on the transverse bar 12 in any suitable manner. In aid of such mounting, however, transverse fuel line routers 33 may be provided on the transverse member 12. The transverse fuel line routers 33 may be used to secure the fuel lines to the transverse member 12 and to prevent unsecured fuel lines from interfering with the proper operation of the improved apparatus.

A transverse track 27 is also rigidly mounted between the carriage 15 and follower 16. The transverse track 27 is aligned to be perpendicular to the longitudinal axis of the master track 13. A carriage 29 is mounted on the transverse track 27. The carriage 39 also carries a cutting tool 28 which may be of conventional manufacture and may be an oxygen-acetylene gas, oxygen-fuel gas or plasma arc torch. The purpose of the cutting tool 28 is to provide a means for squaring the ends of the rectangular metallic plates produced by the operation of the preferred embodiment described herein. The cutting tool 28 may also be fed by conventional fuel lines which may be mounted on the transverse member, but which have also been omitted from the drawing for purposes of clarity.

The foregoing description of the preferred embodiment described herein has included not only a description of the various parts of the improved apparatus, but also the methods whereby each individual part is made or mounted on the apparatus. However, the construction of the above-described preferred embodiment will be further understood through the following general description.

The improved apparatus may be constructed by first laying out the location of the collinear I-beams 10 and 11 and installing the mounting plates 17 at appropriate locations along the planned length of the I-beams 10 and 11. Each mounting plate 17 should be secured in place by means of a concrete base 46 or by some other suitable means of securing the mounting plate 17 to the surface on which the improved apparatus will rest. The collinear I-beams 10 and 11 are then mounted in the mounting plates 17 in the sliding manner previously described.

The transverse support beams 35 may thereafter be mounted on the surface on which the improved apparatus will rest by means of mounting brackets 36 similarly set in concrete bases 46 or any other suitable means for securing the mounting brackets 36. Once the transverse support beams 35 are in place, the longitudinal support beams 34 may be rigidly mounted to the transverse beams 35 to provide a base for support of a work piece 1.

The master track 13 and the drive track 18 should thereafter be installed on the upper surface of the first parallel I-beam 10, as has been previously described.

The follower track 14 should be fabricated by constructing the follower track mold and channel 45 on the upper surface of the second parallel I-beam 11, and by pouring and setting the graphite composite epoxy material to provide the follower track 14 as has been previously described.

The carriage 15 and the follower 16 should thereafter be constructed according to conventional techniques, being careful to accurately align the roundway bearings 22 or ball bushings 61 on the carriage 15. The carriage 15, including the roundway bearings 22 or ball bushings 61, should thereafter be accurately and rigidly secured to the transverse member 12 by welding or in any other suitable manner, in such a manner that, when the master track 13 is in communication with the roundway bearings 22 or ball bushings 61, the longitudinal axis of the master track 13 will be perpendicular to the transverse member 12. The follower 16 should also be rigidly mounted perpendicular to the transverse member 12.

The end cutting track 27 should thereafter be rigidly mounted between the carriage 15 and the follower 16 such that the end cutting track 27 will be perpendicular to the master track 13 when the roundway bearings 22 or ball bushings 61 on the carriage 15 are in rolling communication with the master track 13. The transverse mounting bar 31 should be rigidly attached to the transverse member 12 in such a manner that it is parallel to the transverse member 12. Finally, the individual cutting tools 30 and the end cutting tool 28 should be mounted on the transverse mounting bar 31 and the end cutting track 27, respectively. The transverse member 12 may thereafter be movably mounted on the master track 13 and the follower track 14 as described in the foregoing specification.

In operation, the work piece 1 is placed upon the longitudinal support beams 34. The individual cutting tools 30 are thereafter adjusted to provide the desired width of the rectangular plates to be made from the work piece 1 and are secured in place by conventional clamps, brackets or set screws. The cutting tools 30 are then started and the transverse member 31 or 71 is moved along the length of the master track 13 and follower track 14 to provide rectangular metallic plates of desired length. The ends of the rectangular plates may then be cut by the end cutting tool 28 to provide rectangular plates of the desired length.

The foregoing descriptions of preferred embodiments of the improved apparatus and a preferred method of constructing the improved apparatus have been merely illustrative and exemplary in purpose and are not intended to be exhaustive of the variety of possible embodiments of the present invention. It will be understood that there are many variations on the structure, apparatus, and application of the preferred embodiment and the method of manufacture thereof which may be made without departing from the scope and spirit of the present invention. Therefore, it will be expressly understood that the foregoing description is not intended in any way to limit the present invention to the embodiments detailed above, and that the present invention shall be limited solely by reference to the appended claims below.

What we claim is:

1. An improvement in an apparatus for guiding a tool in a linear path relative to a work piece, including a means for supporting said work piece, a first linear track member, a second collinear track member laterally displaced from said first linear track member, a transverse member movably supported by said first linear track member and said second collinear track member, and a tool carried by said movable transverse member, wherein the improvement comprises:
(a) A means for maintaining perpendicularity between said first linear track member and said transverse member;
(b) A means for providing rolling support for said transverse member by said second collinear track member; and
(c) A second collinear track member having a horizontal epoxy supportive surface made from a liquid epoxy material hardened into a horizontal supportive surface, said horizontal epoxy supportive surface being in communication with said means for providing rolling support for said transverse member by said second collinear track member.

2. An improvement in an apparatus for guiding a tool in a linear path relative to a work piece as set forth in claim 1, wherein said means for providing rolling support for said transverse member by said second collinear track member includes a caster.

3. An improvement in an apparatus for guiding a tool in a linear path relative to a work piece as set forth in claim 1, further including a bracket means for securing said second collinear track member in lateral displacement from said first linear track member, and wherein said bracket means is in sliding communication with said second collinear track member to permit the longitudinal expansion of said second collinear track member without deformation along the longitudinal axis of said second collinear track member.

4. An improvement in an apparatus for guiding a tool in a linear path relative to a work piece in claim 1, further including a bracket means for securing said first linear track member and lateral displacement from said second collinear track member, wherein said bracket means is in sliding communication with said first linear track member to permit the longitudinal expansion of said first linear track member without deformation along the longitudinal axis of said first linear track member.

5. An improvement in an apparatus for guiding a tool in a linear path relative to a work piece as set forth in claim 1 wherein said means for maintaining perpendicularity between said first linear track member and said transverse member includes:
(a) A first linear track member having a longitudinal roundway track of circular cross-section; and
(b) A transverse member having a first plurality of bearing support surfaces in communication between said transverse member and said roundway track, said first plurality of bearing support surfaces being angularily displaced with respect to the cross-section of said roundway track; a second plurality of bearing support surfaces in communication between said transverse member and said roundway track, said second plurality of bearing support surfaces being angularily displaced with respect to the cross-section of said roundway track; and said first plurality of bearing support surfaces and said second plurality of bearing support surfaces being longitudinally displaced with respect to the longitudinal axis of said roundway track.

6. An improvement in an apparatus for guiding a tool in a linear path relative to a work piece as set forth in claim 5 wherein said first plurality of bearing support surfaces include a plurality of roundway bearings.

7. An improvement in an apparatus for guiding a tool in a linear path relative to a work piece as set forth in claim 5 wherein said second plurality of bearing support surfaces include a plurality of roundway bearings.

8. An improvement in an apparatus for guiding a tool in a linear path relative to a work piece as set forth in claim 5 wherein said first plurality of bearing support surfaces comprises a ball bushing.

9. An improvement in an apparatus for guiding a tool in a linear path relative to a work piece as set forth in claim 5 wherein said second plurality of bearing support surfaces comprises a ball bushing.

10. A method of manufacturing an improved apparatus for guiding a tool in a linear path relative to a work piece, including a means for supporting said work piece; a first linear track member; a second collinear track member having a horizontal upper surface and said second collinear track member being laterally displaced from said first linear track member; a transverse member maintained in perpendicularity with said first linear track member and movably supported by said first linear track member and rollingly supported by said second collinear track member; and a tool carried by said movable transverse member, which includes the following steps:
(a) Introducing a liquid into a mold which circumscribes a longitudinal upper surface of said second collinear member and which permits the upper surface of said liquid material to settle freely in a horizontal plane; and
(b) Permitting said liquid to harden in said mold to provide a horizontal solid upper surface for said second collinear track member.

11. An improved apparatus for guiding a tool in a linear path relative to a work piece, including a means for supporting said work piece; a first linear track member; a second collinear track member having a horizontal upper surface and said second collinear track member being lateally displaced from said first linear track member; a transverse member maintained in perpendicularity with said first linear track member and movably supported by said first linear track member and rollingly supported by said second collinear track member; and a tool carried by said movable transverse member, manufactured by the method including the following steps:
(a) Introducing a liquid into a mold which circumscribes a longitudinal upper surface of said second collinear track member and which permits the upper surface of said liquid to settle freely in a horizontal plane; and
(b) Permitting said liquid to harden in said mold to provide a horizontal solid upper surface for said second collinear track member.

12. An improved apparatus for guiding a tool in a linear path relative to a work piece as set forth in claim 11 wherein said liquid is an epoxy material.

13. An improved apparatus for guiding a tool in a linear path relative to a work piece as set forth in claim 11 wherein said liquid is a graphite composite epoxy material.

14. An improved apparatus for guiding a tool in a linear path relative to a work piece as set forth in claim 11 wherein said liquid is a thermosetting resin.

15. An improvement in an apparatus for guiding a tool in a linear path relative to a work piece, including a means for supporting said work piece, a first linear track member, a second collinear track member laterally displaced from said first linear track member, a transverse member movably supported by said first linear track member and said second collinear track member, and a tool carried by said movable transverse member, wherein the improvement comprises:
(a) A first linear track member having a longitudinal roundway track of circular cross-section; and
(b) A transverse member having a first plurality of bearing support surfaces in communication between said transverse member and said roundway track, said first plurality of bearing support surfaces being angularily displaced with respect to the cross-section of said roundway track; a second plurality of bearing support surfaces in communication between said transverse member and said roundway track, said second plurality of bearing support surfaces being angularily displaced with respect to the cross-section of said roundway track; and said first plurality of bearing support surfaces and said second plurality of bearing support surfaces being longitudinally displaced with respect to the longitudinal axis of said roundway track.

16. An improvement in an apparatus for guiding a tool in a linear path relative to a work piece as set forth in claim 15 wherein said first plurality of bearing support surfaces include a plurality of roundway bearings.

17. An improvement in an apparatus for guiding a tool in a linear path relative to a work piece as set forth in claim 15 wherein said second plurality of bearing support surfaces include a plurality of roundway bearings.

18. An improvement in an apparatus for guiding a tool in a linear path relative to a work piece as set forth in claim 15 wherein said first plurality of bearing support surfaces comprises a ball bushing.

19. An improvement in an apparatus for guiding a tool in a linear path relative to a work piece as set forth in claim 15 wherein said second plurality of bearing support surfaces comprises a ball bushing.

20. An improvement in an apparatus for mounting a tool on a sturcture for supporting said tool above a work piece, while said tool is in relative motion with said work piece, and for maintaining the vertical distance between said tool and said work piece, including:
(a) A mounting means for mounting said improved apparatus on said structure, which mounting means includes a vertical member including at least one vertical trackway;
(b) A vertically moveable carriage means for carrying said tool at a predetermined vertical distance above the surface of said work piece, which vertically moveable carriage means is in rolling communication with said vertical trackway; and
(c) A regulating means for regulating the vertical distance between said vertically moveable carriage means and said work piece.

* * * * *